(12) United States Patent
Batdorf

(10) Patent No.: US 6,387,993 B1
(45) Date of Patent: May 14, 2002

(54) FLAME RETARDANT COMPOSITION

(75) Inventor: Vernon H. Batdorf, Minneapolis, MN (US)

(73) Assignee: H. B. Fuller Licensing & Financing Inc., St. Paul, MN (US)

(*) Notice: Subject to any disclaimer, the term of this patent is extended or adjusted under 35 U.S.C. 154(b) by 0 days.

(21) Appl. No.: 09/587,750

(22) Filed: Jun. 5, 2000

(51) Int. Cl.$^7$ .............................. C08K 5/5419
(52) U.S. Cl. .................. 524/188; 428/391; 428/396; 524/406; 524/425; 524/437; 524/516; 524/548; 524/808; 524/264
(58) Field of Search ................. 524/188, 548, 524/516, 808, 437, 405, 425; 428/391, 396

(56) References Cited

U.S. PATENT DOCUMENTS

| | | | | |
|---|---|---|---|---|
| 3,166,525 A | * | 1/1965 | Perry ........................ | 524/808 |
| 3,922,442 A | * | 11/1975 | North et al. ................ | 524/437 |
| 3,926,905 A | * | 12/1975 | Nose et al. ................ | 524/297 |
| 4,058,124 A | * | 11/1977 | Yen et al. .................. | 523/125 |
| 4,162,245 A | * | 7/1979 | Collins et al. ............... | 524/495 |
| 4,455,331 A | * | 6/1984 | Barsotti ..................... | 524/548 |
| 4,695,619 A | | 9/1987 | Hamermesh et al. | |
| 4,778,544 A | | 10/1988 | Jones et al. | |
| 4,785,039 A | * | 11/1988 | Algrim et al. ............... | 524/188 |
| 4,992,481 A | * | 2/1991 | von Bonin et al. ........... | 521/54 |
| 5,025,042 A | * | 6/1991 | Yoshida et al. .............. | 524/436 |
| 5,039,509 A | * | 8/1991 | Miyata et al. ............... | 524/436 |
| 5,057,367 A | | 10/1991 | Morii et al. | |
| 5,258,227 A | | 11/1993 | Gaa et al. | |
| 5,302,639 A | * | 4/1994 | Shimizu et al. .............. | 524/548 |
| 5,338,777 A | * | 8/1994 | Tarquini ..................... | 524/445 |
| 5,461,101 A | * | 10/1995 | Rothon et al. ............... | 524/436 |
| 5,916,391 A | | 6/1999 | Riedel et al. | |
| 6,022,914 A | | 2/2000 | Nowak et al. | |

FOREIGN PATENT DOCUMENTS

| | | |
|---|---|---|
| EP | EP 0 465 918 | 1/1992 |
| WO | WO 94 11425 | 5/1994 |

OTHER PUBLICATIONS

Lyons: "The Chemistry and Uses of Fire Retardents" —pp. 3–8 (1970).*

* cited by examiner

Primary Examiner—Veronica P. Hoke
(74) Attorney, Agent, or Firm—Bin Su

(57) ABSTRACT

The invention relates to a water-based flame-retardant composition comprising at least one polyvinylpyrrolidone polymer, at least one silane coupling agent and at least one inorganic compound. The flame-retardant composition has low organic content and low toxicity. The flame-retardant composition may further comprise at least one polymeric emulsion and can be used as a coating or an adhesive. The invention also provides a flame-retardant article comprising a substrate and the flame-retardant composition disposed on a surface of the substrate.

29 Claims, No Drawings

FLAME RETARDANT COMPOSITION

FIELD OF THE INVENTION

The invention relates to a water-based flame-retardant composition. Particularly, the invention relates to a water-based flame-retardant composition useful as a coating or an adhesive.

BACKGROUND OF THE INVENTION

Flame-retardant compositions are used extensively throughout structures such as buildings; structural beams and columns; ceilings; walls; furnishings and other construction components; as well as airplanes; ships and submarines. When components of these structures, including the incorporated flame-retardant compositions, burn, they can present hazards to occupants of the structures. A particular concern is the spread of flame and the generation of smoke, heat and toxic gases when fires occur in confined structures such as occupied buildings, ships and submarines.

Many conventional flame-retardant compositions contain very high levels of organic components and halogens such as chlorine and bromine. Organic components are flammable and contribute not only to the spread of the fire, but also the generation of smoke and heat release. Halogen-containing components also produce toxic gases that threaten life and are corrosive. This is a particular concern for flame-retardant compositions used on ships and submarines, where not only flame spread and smoke, but also heat release and toxic gases during the fire are extremely detrimental.

Efforts have been made to develop some non-halogen, water based flame-retardant coating compositions. The organic content of these compositions are normally higher than 35%, and can be as high as over 50%, based on the dried film, as the binders and certain additives are typically of an organic nature. Because of the high organic content in current flame-retardant coating compositions, while they may be able to meet the requirements for low flame spread, they would be high in smoke and contribute significantly to toxic gasses and heat release. However, reducing the organic content in these flame-retardant coating compositions would cause many other application problems with adhesion, flexibility, film formation, film integrity and shelf stability.

Accordingly, a substantial need exists for a flame-retardant composition having low organic content and capable of meeting the desired fire safety as well as the service and application conditions such as good adhesion to the various substrates, paintability, flexibility, wet adhesive strength, crack resistance, shelf stability and non-hazardous during application.

SUMMARY OF THE INVENTION

In one aspect, the invention features a water-based flame-retardant composition comprising at least one polyvinylpyrrolidone polymer; at least one silane coupling agent; and at least one inorganic compound.

In another aspect, the invention features a water-based flame-retardant composition further comprising at least one polymeric emulsion.

In yet another aspect, the invention provides an article comprising a substrate and any one of the aforesaid flame-retardant compositions disposed on a surface of the substrates.

In yet another aspect, the invention provides a method of manufacturing a coated article comprising applying any one of the aforesaid flame-retardant compositions to a surface of a substrate.

The water-based flame-retardant composition of the invention can be formulated to have low organic content and to be free of halogens such that they exhibit low flame spread, low smoke and do not contribute significantly to toxic gases and heat release in a fire.

Particularly, the water-based flame-retardant composition can be formulated to be endothermic and noncombustible such that it does not contribute to the burning and does not generate toxic gases in a fire, therefore, can be non-hazardous during a fire.

The water-based flame-retardant composition can also be formulated to have good wet and dry adhesive strengths as well as very good shelf stability.

The water-based flame-retardant composition can also be formulated for easy application, e.g., by brushing, troweling, extrusion or spraying.

The water-based flame-retardant composition of the invention is useful as a coating or an adhesive, or a combination thereof.

Other features of the invention will be apparent from the following description of the invention and preferred embodiments thereof, and from the claims.

DETAILED DESCRIPTION OF THE INVENTION

The water-based flame-retardant composition of the invention comprises at least one polyvinylpyrrolidone polymer; at least one silane coupling agent; at least one inorganic compound; and optionally, at least one polymeric emulsion.

Examples of useful polyvinylpyrrolidone polymers includes polyvinylpyrrolidone polymers that is commercially available under a number of trade designations including, e.g., PVP K-15, K-30, K-90, and K-120 from International Specialty Products, Bound Brook, N.J. Polyvinylpyrrolidone polymer is present in the flame-retardant compositions, preferably, in an amount of from 0.5% by weight to about 8.0% by weight, more preferably about 1.0% by weight to about 6.0% by weight, most preferably about 1.0% by weight to about 4.0% by weight, based on the total weight of the composition. In another aspect of the invention, when a polymeric emulsion is included in the flame-retardant composition, the polyvinylpyrrolidone polymer may be present, preferably, in an amount of from 0.1% by weight to about 2% by weight, more preferably about 0.1% by weight to about 1% by weight, most preferably about 0.2% by weight to about 0.7% by weight, based on the total weight of the composition.

The silane coupling agents useful in the compositions of the invention are selected to be compatible with the composition and to have good wetting properties for the inorganic compounds. Examples of useful types of silane coupling agents include amino (e.g., styrylamino), acrylate, methacrylate, epoxy, vinyl, and mercapto silane coupling agents and mixtures thereof. Particularly preferred silane coupling agents are amine and epoxy silane coupling agents such as N-[3-(trimethyoxysilyl)propyl]-1,2-ethanediamine and gamma-glycidoxypropyltrimethoxysilane. Examples of commercially available silane coupling agents include those under the trade designations Silquest A-187, A-189, A-1100, A-1120 and A-1170 from OSI Specialties, Inc., Greenwich, Conn. The silane coupling agent may be present in the composition, preferably, in an amount of from about 0.1% by weight to about 1% by weight, more preferably, about 0.2% by weight to about 0.6% by weight, based on the total weight of the composition.

Many inorganic compounds are known and used as flame-retardant agents. Many other inorganic additives, such as mineral fillers and pigments typically used in paint and adhesive formulations, also exhibit flame-retardant properties and can function as noncombustible filler/extenders, thus, act as flame-retardant agents in the invention. The inorganic compounds useful in the compositions of the invention include both the known inorganic flame-retardant agents and other inorganic additives capable of acting as flame-retardant agents. Examples of useful inorganic compounds include metal oxides such as aluminum oxide, titanium dioxide, and antimony trioxide; metal carbonates such as calcium carbonate, magnesium carbonate, zinc carbonate and barium carbonate; metal hydroxides such as aluminum hydroxide and magnesium hydroxide; and metal sulfates such as calcium sulfate and barium sulfate; and combinations thereof. Other suitable inorganic compounds include molybdic oxide, ammonium octamolybdate and other molybdates, zinc phosphate, ammonium polyphosphate, magnesium borate. Talc, kaolin, clay, silica, bentonite, mica, feldspar, carbon black, wollastonite, and combinations thereof are also suitable. Preferred inorganic compounds do not emit toxic gases, e.g., chlorine and bromine, during combustion and are endothermic such as hydrated minerals, e.g., hydrated alumina, hydrated calcium sulfate and zinc borate. The inorganic compound is useful in a variety of forms including, e.g., powder, particles and fibers.

The amount of inorganic compounds present in the composition is preferably from at least about 30% by weight, more preferably at least about 50% by weight, based on the total amount of the composition.

The flame-retardant composition of the invention also includes water. Preferably water is present in the composition in an amount of from about 20% to about 65% by weight, more preferably from about 25% by weight to about 50% by weight, based on the total weight of the composition.

The polymeric emulsion is selected to provide a composition that forms a film and maintains its cohesive integrity upon exposure to high humidity environments. Preferably, the polymeric emulsion is selected to provide a composition that, when dry, is washable, i.e., can be washed with water without disintegrating.

The polymer component of the emulsion is selected to be substantially inflammable to minimize flame spread and smoke contribution during a fire and to provide very good wet and dry adhesion. Examples of useful polymers include, e.g., vinyl acrylate, ethylene vinyl acetate, acrylic polymers and their copolymers, nitrile polymers and their copolymers, and combinations thereof.

The polymeric emulsion can be present in the flame-retardant composition in an amount of about 2% by weight to about 15% by weight, more preferably, about 4% by weight to about 12% by weight, most preferably about 5% by weight to about 8% by weight, based on the total weight of the composition.

The flame-retardant composition of the invention may include other optional components such as additives typically used in paint and adhesive compositions, e.g., wetting agents, dispersing aids, thickeners, surfactants, pigments, defoaming agents and antimicrobial agents. Wetting agents may be added to improve the speed of dispersion of the components in the composition during manufacture and to alter, e.g., lower, the viscosity of the composition. Useful wetting agents include nonionic surfactants, anionic surfactants and phosphates salts, e.g., potassium tripolyphosphate. Examples of commercially available wetting agents are those under the trade designations AMP-95 from Angus Chemical Co., Triton X-100 from Union Carbide Corp Industrial Chemicals Div. and Tamol 731 from Rohm & Hass Co.

The components of the flame-retardant composition of the invention can be selected to minimize the amount of organic compounds present in the composition, so as to minimize the amount of fuel and smoke that the composition contributes to a fire. Preferably, the amount of organic compounds present in the flame-retardant composition is no greater than about 20% by weight, more preferably no greater than about 15% by weight, even more preferably, no greater than about 10% by weight, most preferably, no greater than about 8% by weight, based on the total weight of the dried composition.

The flame-retardant composition of the invention is formulated to be fire retardant such that, under ambient conditions, it does not maintain a flame on removal of a source of fire. Preferably the flame-retardant composition is formulated to be noncombustible, i.e., does not sustain flaming when contacted with a flame.

One measure of the flame-retardant property of a composition is its Oxygen Index according to ASTM D 2863-91. Oxygen Index is referred as the minimum concentration of oxygen, expressed as volume percent, in a mixture of oxygen and nitrogen that will just support flaming combustion of a material initially at room temperature under the above identified test conditions. The higher the Oxygen Index, the more fire resistant the composition. Preferably, the flame-retardant composition of the invention exhibits an Oxygen Index of greater than about 50%, more preferably, at least about 60%, most preferably, at least about 80%.

Further, the flame-retardant composition exhibits, preferably, a 180° peel strength to a woven and sized fiberglass substrate of at least about 13 N, more preferably, at least about 17 N, most preferably, at least about 20 N when tested according to the 180° Peel Strength Test Method. The composition can also be formulated to exhibit a 180° peel strength to a woven fiberglass cloth 3 inch wide tape substrate after aging for 24 hours at 100% humidity of at least about 4.4 N, preferably, at least about 6 N, and more preferably, at least about 7 N.

The components of the flame-retardant composition of the invention can be selected to achieve a composition having useful viscosity for the application in which the composition is to be used. Preferably the components are selected to achieve a flame-retardant composition that maintains a desired viscosity over time, i.e., there is no significant change in viscosity during aging, which can be detrimental to application. Preferably the flame-retardant composition exhibits good shelf stability, e.g., has a substantially stable viscosity for one year. The good shelf stability is believed, but not to be bounded to, to be achieved due to the synergetic effect of the polyvinylpyrrolidone and the silane coupling agent used in the composition.

The flame-retardant composition of the invention may be prepared by any conventional technique using equipment typical for making coatings/paint or adhesives. A Cowles Dissolver, Hockmeyer Mixer, or even horizontal ribbon mixers are all suitable equipment, and will provide adequate dispersion.

The composition may be applied to various substrates including, e.g., a woven or non-woven fiberglass web or cloth; 3–6 lb/ft$^3$ density fiberglass insulation; polyurethane foam; polystyrene foam; polyimide foam; wood; cement and other building components and furnishings to produce flame-retardant articles.

The flame-retardant composition can be applied to a substrate using a variety of methods including, e.g., painting, e.g., by hand or with a brush, spraying, troweling, or extrusion.

The invention will be described further by way of the following examples. All parts, ratios, percents and amounts stated in the Examples are by weight unless otherwise specified.

EXAMPLES

Test Procedures

Test procedures used in the examples include the following.

180° Peel Strength Test Method

The 180° peel strength of a composition is measured at ambient temperature using a 10 lb (44 N) scale Chatillon Tester as follows:

The composition to be test is applied by brushing to a fiberglass insulation facing substrate (specified as Type I, Class 2 in MIL-C-20079H). Then, a 2 inch tight weave fiberglass cloth (specified Type I, Class 3 in MIL-C-20079H) is embedded into the coated fiberglass substrate. After the laminated specimen is allowed to dry for minimum 24 hours at ambient temperature, one end of the top strip is peel back from the specimen at least one inch. The peeled-back strip is then clamped to the Chatillon Tester. The peel strength of the composition is measured by pulling the strip from the specimen at an angle of 180° and a rate of 12 inches/min.

180° Peel Strength at High Humidity Test Method

180° Peel Strength at High Humidity is tested using the same method as 180° Peel Strength Test Method except that, after 24 hours dry at ambient temperature, the specimen is exposed to 100% relative humidity at 100° F. (37.8° C.) for 24 hours.

Oxygen Index Test Method

Oxygen Index is tested according to ASTM D2863-91 Standard Test Method for Measuring the Minimum Oxygen Concentration to Support Candle-like Combustion of Plastics (Oxygen Index).

Combustion Test Method

Combustibility is tested according to CGD 74-129, 41 FR 41701 Standard Test Method for Noncombustible Materials for Merchant Vessels of Coast Guard, DOT ζ164.009, (Sep. 23, 1976). Viscosity Viscosity is tested at 20 RPM, 77° F. (25° C.) using a Brookfield viscometer on specimen aged in sealed container at ambient conditions for up to 12 months.

Example 1

A composition was prepared by combining 32.47% by weight water, 0.90% by weight VOLCLAY PREMIUM GEL Bentonite clay (American Colloid Co., Arlington Heights, Ill.), 0.30% by weight CELLULOSIZE QP-4400H hydroxyethyl cellulose (Union Carbide Co., Danbury, Conn.), 0.30% by weight PVP K 30 polyvinylpyrrolidone (ISP, Bound Brook, N.J.), 0.13% by weight KTPP potassium tripolyphosphate (FMC Corp., Philadelphia, Pa.), 0.13% by weight AMP-95® 2-amino-2-methyl-1-propanol (Angus Chemical Co., Buffalo Grove, Ill.), 0.09% by weight TRITON X-100 octylphenoxypolyethoxyethanol nonionic surfactant (Union Carbide Co., Danbury, Conn.), 0.30% by weight TAMOL® 731 (25% solution) sodium salt of polymeric carboxylic acid (Rohm and Haas Co., Philadelphia, Pa.), 0.03% by weight Antifoam B Emulsion silicone emulsion (Dow Corning Co., Midland, Mich.), 8.70% by weight ZB-467 zinc borate (Anzon, Inc., Philadelphia, Pa.), 0.45% by weight SILQUEST A-1120 silane (OSI Specialties, Inc., Greenwich, Conn.), 22.60% by weight alumina trihydrate, 12.30% by weight MONO 90 Kaolin clay (Standard Industrial Minerals, Inc., CA), 15.00% by weight USG Terra Alba-No. 1, hydrated calcium sulfate (United States Gypsum Co, Chicago, Ill.), 6.10% by weight AIRFLEX 809 (55% solution) vinyl acetate/ethylene/butyl acrylate terpolymer (Air Products Polymers, L.P., Allentown, Pa.), and 0.20% by weight ALCOGUM® L-89 (30% solution) acrylic thickener (ALCO Chemical, Chattanooga, Tenn.) in a Hockmeyer mixer. The composition is smooth, uniform and easy to apply. The organic content is about 6.9% by weigh based on the dried film.

After exposure to 100% relative humidity at 100° F., the composition exhibited 180° peel strength of about 5 N. The composition was also tested according to the 180° Peel Strength Test Method, Oxygen Index Test Method, Combustion Test Method and Viscosity Test Method. The results are listed in Table 1.

Example 2

A composition was prepared by combining 32.47% by weight water, 0.90% by weight VOLCLAY PREMIUM GEL 0.30% by weight PVP K 30, 0.30% by weight CELLULOSIZE QP-4400H, 0.13% by weight KTPP, 0.13% by weight AMP-95®, 0.09% by weight TRITON X-100, 0.30% by weight TAMOL® 731, 0.03% by weight Antifoam B Emulsion, 8.70% by weight ZB-467, 0.45% by weight SILQUEST A-1120 silane, 22.60% by weight alumina trihydrate, 12.30% by weight MONO 90, 15.00% by weight USG Terra Alba-No.1, 5.10% by weight AIRFLEX 809 and 0.20% by weight ALCOGUM L-89 in a Hockmeyer mixer. The composition is smooth, uniform and easy to apply. The organic content is about 6.0% by weight based on the dried film.

The composition was then tested according to the 180° Peel Strength Test Method, Oxygen Index Test Method, Combustion Test Method and Viscosity Test Method. The results are listed in Table 1.

Example 3

A composition was prepared according to Example 2, except that 0.45% by weight Y-15078 (organosilane ester. Witco Corporation, Greenwich, Conn.) was used. The composition is smooth, uniform and easy to apply. The organic content is about 6.0% by weight based on the dried film.

The composition was then tested according to the 180° Peel Strength Test Method, Oxygen Index test Method, Combustion Test Method and Viscosity Test Method. The results are listed in Table 1.

Example 4

A composition was prepared by combining 34.67% by weight water, 0.90% by weight VOLCLAY PREMIUM GEL, 0.44% by weight PVP K 30, 0.13% by weight KTPP, 0.13% by weight AMP-95®, 0.09% by weight TRITON X-100, 0.30% by weight TAMOL® 731 (25% solution), 0.03% by weight Antifoam B Emulsion, 8.70% by weight ZB-467, 0.31% by weight SILQUEST A-1120 silane, 22.60% by weight alumina trihydrate, 12.30% by weight MONO 90, 13.90% by weight KTPP, 5.20% by weight AIRFLEX 809 (55% solution), and 0.30% by weight ALCOGUM® L-89 (30% solution) in a Hockmeyer mixer. The composition is smooth, uniform and easy to apply. The organic content is about 5.9% based on the dried film.

The composition was then tested according to Oxygen Index Test Method and Viscosity Test Method. The results are listed in Table 1.

TABLE 1

| Example No. | 1 (175) | 2 (173) | 3 (174) | 4 (−167) |
|---|---|---|---|---|
| 180° Peel Strength (N) | 23.6 | 19.1 | 22.2 | N.T. |
| Oxygen Index | >80% | >80% | >80% | >80% |
| Combustion | Non-combustible | non-combustible | non-combustible | non-combustible |
| Viscosity (cps) | | | | |
| initial | 35,300 | 23,000 | 54,000 | 11,000 |
| after 1 Mon. | 51,000 | 43,500 | 54,000 | N.T. |
| after 2 Mon. | 44,000 | N.T. | N.T. | N.T. |
| after 7 Mon. | N.T. | 70,000 | 74,000 | N.T. |
| after 11 Mon. | N.T. | N.T. | N.T. | 7,100 |

*N.T.—not tested.

What is claimed are:

1. A water-based flame-retardant composition comprising:
at least one polyvinylpyrrolidone polymer,
at least one silane coupling agent in an amount sufficient for providing wetting property for inorganic compound(s); and
at least one inorganic compound selected from the group consisting of flame-retardant agents, compounds capable of acting as flame-retardant agents, and mixtures thereof, wherein said composition contains no greater than about 20% by weight organic compounds, based on the total weight of the dried composition.

2. The composition of claim 1 further comprising at least one polymeric emulsion.

3. The composition of claim 1, wherein said inorganic compound comprises flame-retardant agents.

4. The composition of claim 1, wherein said inorganic compound comprises compounds which act as flame-retardant agents.

5. The composition of claim 1, wherein said composition contains no greater than about 15% by weight organic compounds.

6. The composition of claim 1, wherein said composition contains no greater than about 8% by weight organic compounds.

7. The composition of claim 1, wherein said composition exhibits an oxygen index of at least about 50%.

8. The composition of claim 1, wherein said composition exhibits an oxygen index of at least about 60%.

9. The composition of claim 8, wherein said composition exhibits an oxygen index of at least about 80%.

10. The composition of claim 9, wherein said composition exhibits a 180° peel strength of at least about 13 N.

11. The composition of claim 1, wherein said polymeric emulsion comprises at least one film-forming polymer.

12. The composition of claim 2, wherein said film-forming polymer is selected from the group consisting of vinyl acrylate, ethylene vinyl acetate, acrylic polymers and their copolymers, nitrile polymers and their copolymers, and mixtures thereof.

13. The composition of claim 12, wherein said composition contains no greater than about 15% by weight organic compounds.

14. The composition of claim 2, wherein said composition contains no greater than about 8% by weight organic compounds.

15. The composition of claim 14, wherein said composition exhibits an oxygen index of at least about 50%.

16. The composition of claim 15, wherein said composition exhibits an oxygen index of at least about 60%.

17. The composition of claim 2, wherein said composition exhibits an oxygen index of at least about 80%.

18. The composition of claim 17, wherein said composition exhibits a 180° peel strength of at least about 13 N.

19. A flame-retardant article comprising a substrate and a flame-retardant composition of claim 18 disposed on a surface of said substrate.

20. The flame-retardant article of 19, wherein said substrate comprises fiberglass, fiberglass web, mineral wool, construction components of buildings, furnishings, watercraft-ships, submarine, and airplanes.

21. A flame-retardant article comprising a substrate and a flame-retardant composition of claim 2 disposed on a surface of said substrate.

22. The flame retardant article of 1, wherein said substrate comprises fiberglass, fiberglass web, mineral wool, construction components of buildings, watercraft-ships, or airplanes.

23. The composition of claim 22, wherein said inorganic compound is selected from the group consisting of metal oxides, metal carbonates, metal hydroxides, metal borates, metal sulfates, and the combinations thereof.

24. The composition of claim 23, wherein said inorganic compound is selected from the group consisting of aluminum oxide, titanium dioxide, antimony trioxide, calcium carbonate, magnesium carbonate, zinc carbonate, calcium carbonate, barium carbonate, aluminum hydroxide, magnesium hydroxide, calcium sulfate, barium sulfate, molybdic oxide, ammonium octamolybdate, zinc phosphate, ammonium polyphosphate, magnesium borate, zinc borate, hydrated alumina, hydrated calcium sulfate, talc, kaolin, clay, silica, bentonite, mica, felspar, carbon black, wollastonite, and combinations thereof.

25. The composition of claim 24, wherein said inorganic compound is selected from the group consisting of calcium carbonate, magnesium carbonate, zinc carbonate, barium carbonate, aluminum hydroxide, magnesium hydroxide, calcium sulfate, barium sulfate, zinc phosphate, magnesium borate, zinc borate, hydrated alumina, hydrated calcium sulfate, and the combinations thereof.

26. The composition of claim 1, wherein said polyvinylpyrrolidone polymer is present in an amount of from about 0.5% to about 8.0% by weight.

27. The composition of claim 26, wherein said silane coupling agent is present in an amount of from about 0.1% to about 1.0% by weight.

28. The composition of claim 27, wherein said polymeric emulsion is present in an amount of from about 2.0% to about 15% by weight.

29. The composition of claim 1, wherein said inorganic compound is present in an amount of at least 30% by weight.

* * * * *

UNITED STATES PATENT AND TRADEMARK OFFICE
CERTIFICATE OF CORRECTION

PATENT NO. : 6,387,993 B1
DATED : May 14, 2002
INVENTOR(S) : Vernon H. Batdorf

It is certified that error appears in the above-identified patent and that said Letters Patent is hereby corrected as shown below:

Column 4,
Line 4, "Hass Co." should be -- Haas Co. --

Column 6,
Line 12, "weigh" should be -- weight --

Column 7,
Line 48, "of claim 1" should be -- of claim 7 --
Line 50, "of claim 9" should be -- of claim 1 --
Line 52, "of claim 1" should be -- of claim 2 --
Line 54, "of claim 2" should be -- of claim 11 --
Line 59, "of claim 12" should be -- of claim 2 --

Column 8,
Line 4, "of claim 14" should be -- of claim 2 --
Line 8, "of claim 2" should be -- of claim 16 --
Line 10, "of claim 17" should be -- of claim 2 --
Line 13, "of claim 18" should be -- of claim 1 --
Line 15, "of 19" should be -- of claim 19 --
Line 22, "of 1" should be -- of claim 21 --
Line 26, "of claim 22" should be -- of claim 1 --
Line 39, "felspar" should be -- feldspar --
Line 51, "of claim 26" should be -- of claim 1 --
Line 55, "of claim 27" should be -- of claim 2 --

Signed and Sealed this

Seventeenth Day of June, 2003

JAMES E. ROGAN
*Director of the United States Patent and Trademark Office*